Patented Apr. 25, 1939

2,155,863

UNITED STATES PATENT OFFICE 2,155,863

RESIN COMPOSITIONS

Ralph A. Jacobson, Wilmington, Del., assignor to E. I. du Pont de Nemours & Company, Wilmington, Del., a corporation of Delaware No Drawing. Application April 29, 1936, Serial No. 77,013

15 Claims. (Cl. 260—69)

This invention relates to new synthetic resins and more particularly to water soluble resins prepared from hydantoins and aldehydes.

An object of this invention is to provide new and useful resins. A further object of this invention is to provide a process for the preparation of new and useful water-soluble resins from hydantoins and formaldehyde. Further objects and advantages will appear hereinafter.

According to the present invention a hydantoin is caused to react with formaldehyde in the presence of a suitable solvent and of catalytic proportions of an alkali metal hydroxide, following which the reaction mixture is acidified, the excess water and formaldehyde are evaporated off and the residual mass then heated until the desired degree of viscosity is obtained.

Although the procedure may be varied, the hydantoin and preferably excess aqueous formaldehyde are mixed, preferably with stirring, approximately 1% of alkali metal hydroxide is added (based upon the weight of hydantoin) and the reaction mixture is gently refluxed for a period of one to three hours. The solution is then acidified with an acid such as acetic acid and the excess formaldehyde and water are evaporated off. The residual mass is at first a thin syrup which changes to a viscous liquid and finally to a solid if the heating is prolonged. Condensation products are thus obtained according to this invention varying from thin liquids to solids as desired.

The hydantoins which may be utilized in this invention may be represented by the general formula:

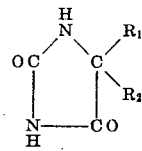

where $R_1$ and $R_2$ are hydrogen or monovalent aliphatic or cycloaliphatic groups such as methyl, ethyl, ethoxy ethyl, cyclohexyl, keto-cyclohexyl, etc. Alternatively, $R_1$ may be hydrogen and $R_2$ any of the aforementioned substituent groups, or $R_1$ and $R_2$ may together form a divalent aliphatic or cycloaliphatic group, as in the 5-disubstituted hydantoin derived from cyclohexanone, or cyclopentanone. However, I generally prefer to use the 5,5-dialkyl hydrantoins, e. g., 5,5-dimethyl hydantoin because this hydantoin is easily made by reacting acetone cyanhydrin with ammonium carbonate.

It will be understood that whenever reference is made to "hydantoin" or to "hydantoin-formaldehyde resin", and the like in the specification and claims, unless otherwise noted, these terms will be taken to mean any of the hydantoins represented by the general formula given above, or their corresponding resins. The hydantoin-formaldehydye resins prepared according to this invention may be described in their physical aspects as being ordinarily very viscous clear syrups or hard solids which are soluble in water and to some extent in ethanol and acetone.

Although the invention is not to be limited thereby the following examples will illustrate how the present invention may be practiced.

*Example 1.*—A mixture of 640 grams (5 mols) of 5,5-dimethyl hydantoin, 1500 grams (18 mols) of 37% aqueous formaldehyde solution, and 4 grams of sodium hydroxide was refluxed for one hour in a suitable reaction vessel. Twenty cubic centimeters of glacial acetic acid was then added and the reaction mixture heated at about 100° C., in an open container until very viscous. The yield of light greenish-yellow syrupy condensation product was 461 grams. On cooling, a transparent sticky condensation product was obtained. Upon heating at about 100° C., this condensation product may be made more viscous or into the form of a soft or hard solid, depending upon the amount of heating. The thin syrupy condensation product is soluble in water in all proportions, moderately soluble in ethanol, acetone, and butyl acetate, but insoluble in aromatic hydrocarbons such as benzene. When the condensation product was heated until it became very viscous, it remained soluble in water, acetone, and ethanol, but became insoluble in butyl acetate. It was soluble in hot isobutanol but separated out when the solution was cooled.

*Example 2.*—A mixture of 14.2 grams (0.1 mol) of 5-methyl 5-ethyl hydantoin, 30 grams (0.37 mol) of 37% aqueous formaldehyde solution, and 0.1 gram of sodium hydroxide was refluxed in a suitable reaction vessel for two hours. One cubic centimeter of glacial acetic acid was then added and the mixture was heated on a hot plate at about 100° C., until excess formaldehyde and water were driven off. A transparent, almost colorless resin was obtained, which was attractive in appearance and which was semi-solid in character. The yield was 17 grams. The resin was very water-soluble, and otherwise had substantially the same properties as the resin described in Example 1.

*Example 3.*—A mixture of 18.6 grams (0.1 mol) of 5-methyl 5-ethoxyethyl hydantoin, 30 grams (0.37 mol) of 37% aqueous formaldehyde, and 0.1 gram of sodium hydroxide was well stirred in a suitable reaction vessel. The mixture warmed up considerably on stirring, giving a yellow solution. Thereafter the reaction mixture was refluxed gently for two hours, 1 cc. of glacial acetic acid was added, and the reaction mixture was evaporated on a hot plate at about 100° C., until the excess formaldehyde and water were driven off. The product was a rather stiff, somewhat tacky, brown resin, readily soluble in water. A yield of 10 grams was obtained.

*Example 4.*—A mixture of 10 grams (0.1 mol) of hydantoin, 20 grams (0.25 mol) of 37% aqueous formaldehyde, and 0.1 gram of sodium hydroxide was well stirred in a suitable reaction vessel. Considerable heat was evolved during the mixing of these ingredients. The reaction mixture was then refluxed for one hour. Upon acidification of the resulting solution with 0.5 cc. of glacial acetic acid and the removal of excess water and formaldehyde by heating as in preceding examples, a clear, solid resin soluble in water but insoluble in alcohol and butyl acetate was obtained.

Harder resins can be prepared according to this invention by substituting urea or a phenol for a part of the hydration such as described in any of the preceding or following examples. Upon treatment of hydantoin-urea or hydantoin-phenol mixtures with formaldehyde substantially as illustrated in the preceding examples, resins are obtained which are probably intimate interpolymers of hydantoin-formaldehyde and urea-formaldehyde or phenol-formaldehyde resins. Despite the hardening action of the urea or the phenol, the resulting resins still retain their valuable water-solubility and their ability to exist as liquid syrups or as moderately hard, solid resins depending upon the amount of heating to which they are subjected during the removal of water and excess formaldehyde. Such a modification of the invention is illustrated in the following example.

*Example 5.*—A mixture of 0.9 mol of 5,5-dimethyl hydantoin, 0.1 mol of urea, and 2.5 mols of formaldehyde in the form of a 37% aqueous solution was refluxed as in preceding examples for about one hour. Upon acidification and evaporation of the reaction mixture as described in the preceding examples, a syrupy condensation product was obtained which was still soluble in water. Upon further heating at approximately 100° C., for several hours, it may be transformed into a solid resin which is somewhat harder and tougher than unmodified 5,5-dimethyl-hydantoin-formaldehyde resins.

Alternatively, a resin may first be prepared from the hydantoin and formaldehyde, and the preformed resin then treated with urea as described in the following example.

*Example 6.*—Twenty-five grams of 5,5-dimethyl hydantoin-formaldehyde resin prepared as described in Example 1 was heated with vigorous stirring on a hot plate at about 100° C., with 1 gram of urea. On cooling, a brittle, transparent, pale-yellow, resin was obtained.

The modification of hydantoin-formaldehyde resins with phenols is illustrated in the following example.

*Example 7.*—Twenty-five grams of 5,5-dimethyl hydantoin-formaldehyde resin prepared as described in Example 1 was heated with 1 gram of phenol at about 100° C., with vigorous stirring. A brittle resin was obtained.

Although the use of 37% aqueous formaldehyde has been specifically described in the examples other aldehydes such as para-formaldehyde can be used provided a solvent such as alcohol is used to facilitate the reaction. Gaseous formaldehyde can also be used in lieu of aqueous formaldehyde by passing it into a solution of the hydantoin in a suitable solvent.

The proportions of the hydantoin to formaldehyde can be varied over a wide range. It is generally preferred to use a relatively large excess of aldehyde over the theoretical amount to compensate for that which is lost during refluxing. If care is taken to avoid loss, however, such as by carrying out the reaction in a closed system, mol ratios of aldehyde to hydantoin as low as 2:1 can be used.

Any alkali metal hydroxide can be used in whole or in part in place of the sodium hydroxide disclosed in the examples. The proportions of alkali metal hydroxide to hydantoin and formaldehyde can likewise be varied over a wide range, these proportions set forth in the examples being only illustrative and not limiting. In general, from 0.5% to 2% of catalyst based upon the weight of the hydantoin is satisfactory although, again, the proportions may be varied over a greater range if desired.

It is convenient to use glacial acetic acid for acidification of the reaction mixture as illustrated in the examples, but other acids may be used instead, e. g., tartaric, citric, oxalic, and even strong mineral acids such as hydrochloric, sulfuric, and phosphoric. The amount of acid used for acidification of the reaction mixture should preferably be such as to make the reaction mixture only slightly acid although larger amounts of acid can be added without injury to the product.

The reaction temperatures used in the present invention are not critical, and temperatures higher or lower than those disclosed in the examples may be used if desired. The refluxing temperature of the reaction mixture when aqueous formaldehyde is used is merely a convenient temperature for carrying out the reaction. In like manner these reactions can be conducted under pressures greater than atmospheric if desired.

From a consideration of the above specification it will be appreciated that many changes and improvements may be made in the invention as described without departing from its scope or sacrificing any of the advantages that may be derived therefrom.

I claim:

1. As a new composition a hydantoin-formaldehyde resin.

2. As a new composition a hydantoin-formaldehyde resin characterized by the fact that the hydantoin involved is represented by the general formula:

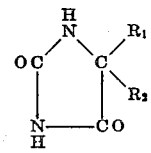

wherein $R_1$ and $R_2$ are selected from the class consisting of hydrogen, monovalent aliphatic radicals, and cycloaliphatic radicals.

3. As a new composition a 5,5-dialkyl substituted hydantoin-formaldehyde resin.

4. As a new composition a 5,5-dimethyl hydantoin-formaldehyde resin.

5. As a new composition a phenol-hydantoin-formaldehyde resin.

6. As a new composition a phenol-hydantoin-formaldehyde resin in which the hydantoin is represented by the general formula:

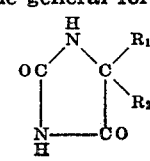

wherein $R_1$ and $R_2$ are selected from the class consisting of hydrogen, monovalent aliphatic radicals, and cycloaliphatic radicals.

7. As a new composition a phenol-5,5-dialkyl substituted hydantoin-formaldehyde resin.

8. As a new composition a phenol-5,5-dimethyl hydantoin-formaldehyde resin.

9. A process for producing hydantoin-formaldehyde resins which comprises reacting a hydantoin and formaldehyde in the presence of an alkali metal hydroxide, acidifying the reaction mixture, evaporating excess water and heating the residual mass.

10. A process for producing hydantoin-formaldehyde resins which comprises reacting a hydantoin and formaldehyde in the presence of an alkali metal hydroxide, acidifying the reaction mixture, evaporating excess water and heating the residual mass, the hydantoin utilized being one represented by the general formula:

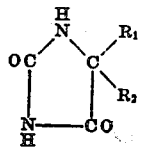

wherein $R_1$ and $R_2$ are hydrogen or monovalent aliphatic or cycloaliphatic groups.

11. A process for producing a hydantoin-formaldehyde resin which comprises reacting 5,5-dialkyl substituted hydantoin with formaldehyde in the presence of an alkali metal hydroxide, acidifying the reaction mixture, evaporating excess water and heating the residual mass.

12. A process for producing a hydantoin-formaldehyde resin which comprises reacting 5,5-dimethyl hydantoin with formaldehyde in the presence of an alkali metal hydroxide, acidifying the reaction mixture, evaporating excess water and heating the residual mass.

13. A process for producing a hydantoin-formaldehyde resin which comprises reacting about 5 mols of 5,5-dimethyl hydantoin and 18 mols of 37% aqueous formaldehyde, in the presence of sodium hydroxide, thereafter acidifying the resultant mixture with acetic acid, and heating the reaction mixture.

14. As a new composition a resin obtained by reacting a hydantoin and formaldehyde in the presence of an alkali metal hydroxide, and subsequently reacting this product with a urea.

15. As a new composition a resin obtained by reacting a hydantoin and formaldehyde in the presence of an alkali metal hydroxide, and subsequently reacting this product with a phenol.

RALPH A. JACOBSON.

CERTIFICATE OF CORRECTION.

Patent No. 2,155,863.

April 25, 1939.

RALPH A. JACOBSON.

It is hereby certified that error appears in the printed specification of the above numbered patent requiring correction as follows: Page 2, first column, line 18, for the word "hydration" read hydantoin; and second column, line 15, for "0.5%" read 0.05%; and that the said Letters Patent should be read with this correction therein that the same may conform to the record of the case in the Patent Office.

Signed and sealed this 30th day of May, A. D. 1939.

(Seal)

Henry Van Arsdale
Acting Commissioner of Patents.